(12) United States Patent
Zhang et al.

(10) Patent No.: US 11,656,433 B2
(45) Date of Patent: May 23, 2023

(54) OPTICAL IMAGING LENS ASSEMBLY

(71) Applicant: Zhejiang Sunny Optical Co., Ltd, Ningbo (CN)

(72) Inventors: Xiaobin Zhang, Ningbo (CN); Jianke Wenren, Ningbo (CN); Liefeng Zhao, Ningbo (CN); Fujian Dai, Ningbo (CN)

(73) Assignee: Zhejiang Sunny Optical Co., Ltd

( * ) Notice: Subject to any disclaimer, the term of this patent is extended or adjusted under 35 U.S.C. 154(b) by 212 days.

(21) Appl. No.: 17/014,437

(22) Filed: Sep. 8, 2020

(65) Prior Publication Data
US 2021/0109318 A1 Apr. 15, 2021

(30) Foreign Application Priority Data
Oct. 11, 2019 (CN) .......................... 201910964009.7

(51) Int. Cl.
*G02B 13/00* (2006.01)
*G02B 9/16* (2006.01)

(52) U.S. Cl.
CPC ........... *G02B 13/0035* (2013.01); *G02B 9/16* (2013.01)

(58) Field of Classification Search
CPC ............................. G02B 13/0035; G02B 9/16
USPC ......................................................... 359/784
See application file for complete search history.

(56) References Cited

U.S. PATENT DOCUMENTS

| | | | | |
|---|---|---|---|---|
| 5,173,809 A * | 12/1992 | Iwaki | .................... | G11B 7/1378 359/708 |
| 7,307,799 B2 * | 12/2007 | Minefuji | ............ | G02B 13/0035 359/716 |
| 7,330,318 B2 * | 2/2008 | Do | ........................... | G02B 9/16 359/716 |
| 8,054,368 B2 | 11/2011 | Yoneyama | | |
| 8,462,449 B2 | 6/2013 | Hsu et al. | | |
| 2005/0237633 A1 * | 10/2005 | Nagai | ................ | G02B 13/0035 359/785 |
| 2005/0253952 A1 * | 11/2005 | Minefuji | ............ | G02B 13/0035 348/335 |
| 2006/0092529 A1 * | 5/2006 | Zeng | .................. | G02B 13/0035 359/784 |
| 2013/0170051 A1 * | 7/2013 | Kubota | .............. | G02B 13/0035 359/784 |
| 2015/0085383 A1 * | 3/2015 | Choi | .................. | G02B 13/0035 359/716 |
| 2019/0179116 A1 | 6/2019 | Huang et al. | | |
| 2020/0124825 A1 | 4/2020 | Liu et al. | | |
| 2021/0110133 A1 | 4/2021 | Li et al. | | |

OTHER PUBLICATIONS

Office Action from Intellectual Property India for Application No. 202014039238, dated Jul. 23, 2021, 11 pages.

* cited by examiner

*Primary Examiner* — James R Greece
(74) *Attorney, Agent, or Firm* — Barnes & Thornburg LLP

(57) ABSTRACT

The present disclosure provides an optical imaging lens assembly including, sequentially from an object side to an image side along an optical axis, a first lens having refractive power; a second lens having refractive power; and a third lens having refractive power. A center thickness CT1 of the first lens along the optical axis and a maximum effective radius DT11 of an object-side surface of the first lens satisfy: $1.0 < CT1/DT11 < 2.0$.

18 Claims, 8 Drawing Sheets

OPTICAL IMAGING LENS ASSEMBLY

CROSS-REFERENCE TO RELATED APPLICATION

This application claims benefit of priority to Chinese Patent Application No. 201910964009.7 filed on Oct. 11, 2019 before the China National Intellectual Property Administration, the entire disclosure of which is incorporated herein by reference in its entity.

TECHNICAL FIELD

The present disclosure relates to the field of optical elements, and specifically, relates to an optical imaging lens assembly.

BACKGROUND

In recent years, with the continuous development of the mobile phone, more and more consumers hope that the mobile phone may have a large screen-to-body ratio. Reducing the size of the front end of the optical imaging lens assembly is one of the effective ways to increase the screen-to-body ratio. In order to meet market's demand, miniaturization of the front end of the lens assembly has become a development trend. At the same time, increasing the relative illumination is beneficial to improving the image quality of the optical imaging lens assembly, so as to obtain the captured image with better imaging quality.

SUMMARY

In one aspect, the present disclosure provides an optical imaging lens assembly which includes, sequentially from an object side to an image side along an optical axis, a first lens having refractive power; a second lens having refractive power; and a third lens having refractive power.

In one embodiment, a center thickness CT1 of the first lens along the optical axis and a maximum effective radius DT11 of an object-side surface of the first lens satisfy: $1.0<CT1/DT11<2.0$.

In one embodiment, a maximum incident angle CRAmax of a chief ray incident onto an electronic photosensitive element of the optical imaging lens assembly satisfies: $15°<CRAmax<25°$.

In one embodiment, a radius of curvature R4 of an image-side surface of the second lens and a radius of curvature R5 of an object-side surface of the third lens satisfy: $4.0<(R4+R5)*100/(R4-R5)<6.5$.

In one embodiment, a distance ETL parallel to the optical axis from an object-side surface of the first lens to an imaging plane of the optical imaging lens assembly at a ½ entrance pupil diameter and a distance EIN parallel to the optical axis from the object-side surface of the first lens to an image-side surface of the third lens at the ½ entrance pupil diameter satisfy: $ETL/EIN<1.5$.

In one embodiment, SAG21, being an on-axis distance from an intersection of an object-side surface of the second lens and the optical axis to a vertex of an effective radius of the object-side surface of the second lens, and SAG12, being an on-axis distance from an intersection of an image-side surface of the first lens and the optical axis to a vertex of an effective radius of the image-side surface of the first lens, satisfy: $1.5<SAG21/SAG12<3.0$.

In one embodiment, SAG22, being an on-axis distance from an intersection of an image-side surface of the second lens and the optical axis to a vertex of an effective radius of the image-side surface of the second lens, and SAG31, being an on-axis distance from an intersection of an object-side surface of the third lens and the optical axis to a vertex of an effective radius of the object-side surface of the third lens, satisfy: $0<|SAG22/SAG31|<1.0$.

In one embodiment, a center thickness CT1 of the first lens along the optical axis and an edge thickness ET1 of the first lens satisfy: $1.0<CT1/ET1<2.0$.

In one embodiment, an edge thickness ET2 of the second lens and a center thickness CT2 of the second lens along the optical axis satisfy: $1.0<ET2/CT2<1.5$.

In one embodiment, a center thickness CT3 of the third lens along the optical axis and an edge thickness ET3 of the third lens satisfy: $1.0<CT3/ET3<2.0$.

In one embodiment, a thickness ETP1 of the first lens at a ½ entrance pupil diameter in a direction parallel to the optical axis, a thickness ETP2 of the second lens at the ½ entrance pupil diameter in the direction parallel to the optical axis and a center thickness CT1 of the first lens along the optical axis satisfy: $1.0<(ETP1+ETP2)/CT1<2.0$.

In one embodiment, a thickness ETP3 of the third lens at a ½ entrance pupil diameter in a direction parallel to the optical axis and an edge thickness ET3 of the third lens satisfy: $1.0<ETP3/ET3<2.0$.

In one embodiment, a total effective focal length f of the optical imaging lens assembly and an effective focal length f1 of the first lens satisfy: $1.0<f/f1<1.5$.

In one embodiment, a combined focal length f23 of the second lens and the third lens and a total effective focal length f of the optical imaging lens assembly satisfy: $1.5<f23/f<3.0$.

In one embodiment, a radius of curvature R2 of an image-side surface of the first lens and a radius of curvature R3 of an object-side surface of the second lens satisfy: $2.0<R2/R3<4.0$.

The optical imaging lens assembly provided by the present disclosure employs a plurality of lenses, including the first lens to the third lens. By reasonably configuring the proportional relationship between the center thickness of the first lens along the optical axis and the maximum effective radius of the object-side surface of the first lens, it is ensured that the optical imaging lens assembly has a larger depth under the premise that the front end of the optical imaging lens assembly is small, so as to achieve the miniaturization of the optical imaging lens assembly.

BRIEF DESCRIPTION OF THE DRAWINGS

Other features, objects, and advantages of the present disclosure will become more apparent from the following detailed description of the non-limiting embodiments with reference to the accompanying drawings. In the drawings.

DETAILED DESCRIPTION OF EMBODIMENTS

Figure 1:
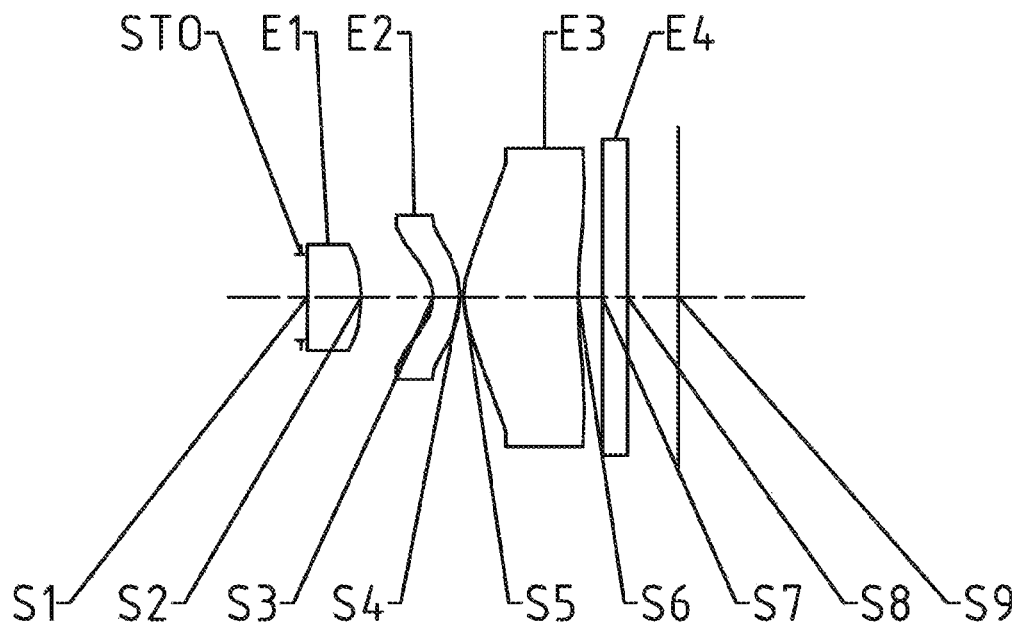
FIG. 1 illustrates a schematic structural view of an optical imaging lens assembly according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include three lenses having refractive power, which are a first lens, a second lens and a third lens. The three lenses are arranged sequentially from an object side to an image side along an optical axis.

In an exemplary embodiment, the first lens may have positive refractive power, and an image-side surface thereof is a convex surface; the second lens may have negative refractive power, an object-side surface thereof is concave surface, and an image-side surface thereof is a convex surface; and the third lens may have positive refractive power, and an object-side surface thereof is convex surface.

In an exemplary embodiment, a center thickness CT1 of the first lens along the optical axis and a maximum effective radius DT11 of an object-side surface of the first lens satisfy: $1.0 < CT1/DT11 < 2.0$. By reasonably configuring the proportional relationship between the center thickness of the first lens along the optical axis and the maximum effective radius of the object-side surface of the first lens, it is beneficial for the optical imaging lens assembly to have a larger depth under the premise that the front end thereof is small, so as to achieve the miniaturization of the optical imaging lens assembly.

In an exemplary embodiment, a maximum incident angle CRAmax of a chief ray incident onto an electronic photosensitive element of the optical imaging lens assembly satisfies: $15° < CRAmax < 25°$, for example, $18° < CRAmax < 25°$. By reasonably setting the maximum incident angle of the chief ray incident onto the electronic photosensitive element, it is beneficial for the optical imaging lens assembly to have a relatively high relative illumination.

In an exemplary embodiment, a radius of curvature R4 of an image-side surface of the second lens and a radius of curvature R5 of an object-side surface of the third lens satisfy: $4.0 < (R4+R5)*100/(R4-R5) < 6.5$. By reasonably configuring the relationship between the radius of curvature of the image-side surface of the second lens and the radius of curvature of the object-side surface of the third lens, it is beneficial to control the CRA (Chief Ray Angle) at the external field-of-view of the optical system, so that the CRA is controlled in a small range.

Figure 11:
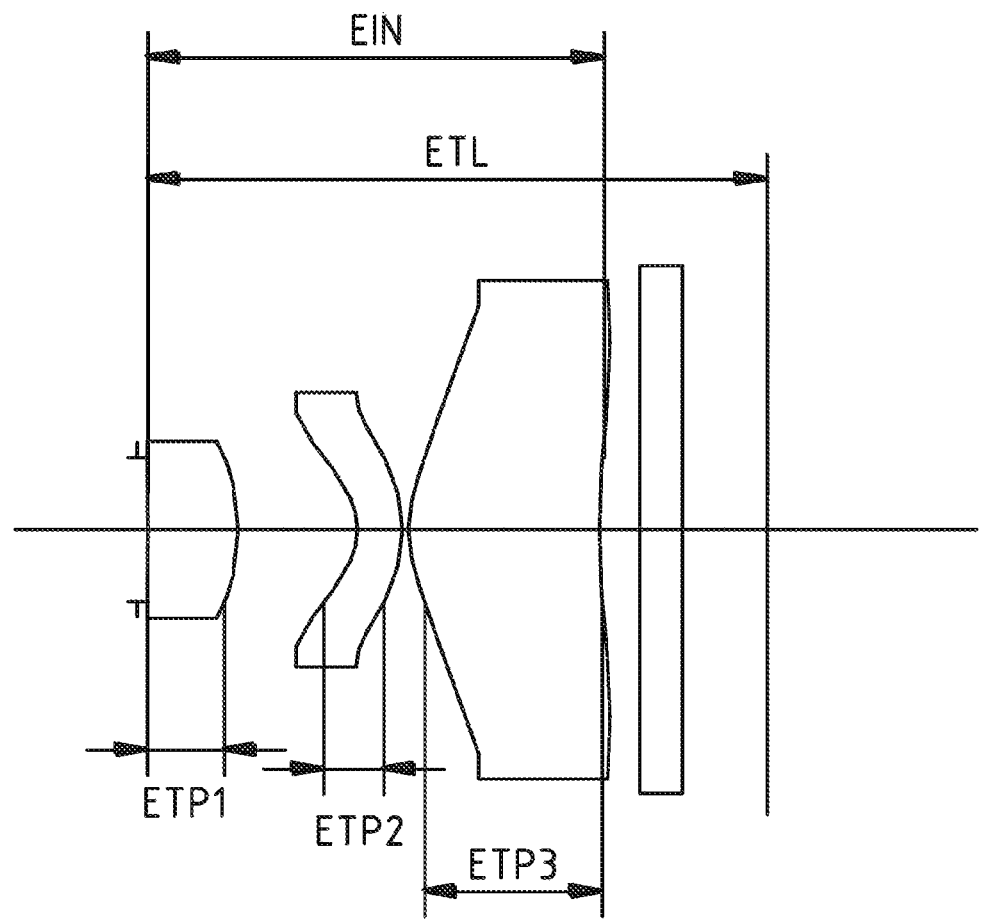
FIG. 11 is a schematic diagram showing the symbolic representation of some parameters of the lens assembly according to the present application.

In an exemplary embodiment, a distance ETL parallel to the optical axis from an object-side surface of the first lens to an imaging plane of the optical imaging lens assembly at a ½ entrance pupil diameter and a distance EIN parallel to the optical axis from the object-side surface of the first lens to an image-side surface of the third lens at the ½ entrance pupil diameter satisfy: ETL/EIN<1.5, for example, 1.2<ETL/EIN <1.5. By reasonably setting the proportional relationship between the distance parallel to the optical axis from the object-side surface of the first lens to the imaging plane of the optical imaging lens assembly at the ½ entrance pupil diameter and the distance parallel to the optical axis from the object-side surface of the first lens to the image-side surface of the third lens at the ½ entrance pupil diameter, the optical imaging lens assembly has a relatively large center thickness and interval, which is beneficial for the optical imaging lens assembly to have a greater degree of design freedom, and beneficial to optimizing the optical imaging lens assembly. At the same time, the above relationship configuration is also beneficial to ensuring the manufacturability of the lens. FIG. 11 is a schematic diagram showing the symbolic representation of some parameters of the lens assembly according to the present application. The distance ETL and the distance EIN are schematically shown in FIG. 11, wherein ETL is the distance parallel to the optical axis from the object-side surface of the first lens to the imaging plane of the optical imaging lens assembly at the ½ entrance pupil diameter, and EIN is the distance parallel to the optical axis from the object-side surface of the first lens to the image-side surface of the third lens at the ½ entrance pupil diameter. Herein, ½ entrance pupil diameter refers to half of the entrance pupil diameter.

In an exemplary embodiment, SAG21, being an on-axis distance from an intersection of an object-side surface of the second lens and the optical axis to a vertex of an effective radius of the object-side surface of the second lens, and SAG12, being an on-axis distance from an intersection of an image-side surface of the first lens and the optical axis to a vertex of an effective radius of the image-side surface of the first lens, satisfy: 1.5<SAG21/SAG12<3.0, for example, 1.8<SAG21/SAG12<3.0. By reasonably setting the proportional relationship between the on-axis distance from the intersection of the object-side surface of the second lens and the optical axis to the vertex of the effective radius of the object-side surface of the second lens with respect to the on-axis distance from the intersection of the image-side surface of the first lens and the optical axis to the vertex of the effective radius of the image-side surface of the first lens, it is beneficial to reduce the curvature of the second lens and control the bending degree thereof, thereby reducing the sensitivity of the lens to ensure the manufacturability thereof.

In an exemplary embodiment, SAG22, being an on-axis distance from an intersection of an image-side surface of the second lens and the optical axis to a vertex of an effective radius of the image-side surface of the second lens, and SAG31, being an on-axis distance from an intersection of an object-side surface of the third lens and the optical axis to a vertex of an effective radius of the object-side surface of the third lens, satisfy: 0<|SAG22/SAG31|<1.0. By reasonably setting the proportional relationship between the on-axis distance from the intersection of the image-side surface of the second lens and the optical axis to the vertex of the effective radius of the image-side surface of the second lens with respect to the on-axis distance from the intersection of the object-side surface of the third lens and the optical axis to the vertex of the effective radius of the object-side surface of the third lens, the curvature of the third lens is greater than the curvature of the second lens, such that the third lens may provide more design freedom, which is beneficial to reducing the CRA of the optical imaging lens assembly.

In an exemplary embodiment, a center thickness CT1 of the first lens along the optical axis and an edge thickness ET1 of the first lens satisfy: 1.0<CT1/ET1<2.0, for example, 1.3<CT1/ET1<1.8. By reasonably setting the proportional relationship between the center thickness of the first lens along the optical axis and the edge thickness of the first lens, it is beneficial to ensure the manufacturability of the first lens. At the same time, by setting the ratio of the center thickness of the first lens along the optical axis to the edge thickness of the first lens in the range from 1 to 2, the size of the front end and the depth of the optical imaging lens assembly may be effectively controlled, which is beneficial to achieving the miniaturization of the optical imaging lens assembly.

In an exemplary embodiment, an edge thickness ET2 of the second lens and a center thickness CT2 of the second lens along the optical axis satisfy: 1.0<ET2/CT2 <1.5. By reasonably setting the proportional relationship between the edge thickness of the second lens and the center thickness of the second lens along the optical axis, it is beneficial to ensure the manufacturability of the second lens.

In an exemplary embodiment, a center thickness CT3 of the third lens along the optical axis and an edge thickness ET3 of the third lens satisfy: 1.0<CT3/ET3<2.0, for example, 1.3<CT3/ET3<1.8. By reasonably setting the proportional relationship between the center thickness of the third lens along the optical axis and the edge thickness of the third lens, it is beneficial to control the center thickness of the third lens, so as to avoid the risk of forming welding marks on the third lens caused by the excessive thickness.

In an exemplary embodiment, a thickness ETP1 of the first lens at a ½ entrance pupil diameter in the direction parallel to the optical axis, a thickness ETP2 of the second lens at the ½ entrance pupil diameter in the direction parallel to the optical axis and a center thickness CT1 of the first lens along the optical axis satisfy: 1.0 <(ETP1+ETP2)/CT1<2.0, for example, 1.3<(ETP1+ETP2)/CT1<1.8. By reasonably setting the relationship among the above three parameters ETP1, ETP2 and CT1, it is beneficial to achieve the miniaturization of the front end of the lens assembly, and control the thickness of the second lens and the optical path of the light at the center field-of-view, thereby controlling the focal length and the total length of the optical imaging lens assembly. The thickness ETP1 and the thickness ETP2 are schematically shown in FIG. 11, wherein ETP1 is the thickness of the first lens at the ½ entrance pupil diameter in the direction parallel to the optical axis, and ETP2 is the thickness of the second lens at the ½ entrance pupil diameter in the direction parallel to the optical axis.

In an exemplary embodiment, a thickness ETP3 of the third lens at a ½ entrance pupil diameter in the direction parallel to the optical axis and an edge thickness ET3 of the third lens satisfy: 1.0<ETP3/ET3<2.0, for example, 1.2<ETP3/ET3<1.7. By reasonably setting the proportional relationship between the thickness of the third lens at the ½ entrance pupil diameter in the direction parallel to the optical axis and the edge thickness of the third lens, it is beneficial to control the shape of the third lens, thereby ensuring the manufacturability of the third lens. The thickness ETP3 of the third lens at the ½ entrance pupil diameter in the direction parallel to the optical axis is schematically shown in FIG. 11.

In an exemplary embodiment, a total effective focal length f of the optical imaging lens assembly and an effective focal length f1 of the first lens satisfy: $1.0<f/f1<1.5$, for example, $1.0<f/f1<1.3$. By reasonably setting the proportional relationship between the total effective focal length of the optical imaging lens assembly and the effective focal length of the first lens, it is beneficial to make the first lens have reasonable refractive power, and make the refractive power of the second lens and the third lens compensate with each other, thereby effectively correcting the aberration of the optical imaging lens assembly.

In an exemplary embodiment, a combined focal length f23 of the second lens and the third lens and a total effective focal length f of the optical imaging lens assembly satisfy: $1.5<f23/f<3.0$, for example, $1.8<f23/f<3.0$. By reasonably setting the proportional relationship between the combined focal length of the second lens and the third lens and the total effective focal length of the optical imaging lens assembly, it is beneficial to reasonably distribute the refractive power, so that the refractive power of the first lens is reasonably restricted, thereby effectively correcting the aberration of the optical imaging lens assembly and improving the image quality.

In an exemplary embodiment, a radius of curvature R2 of an image-side surface of the first lens and a radius of curvature R3 of an object-side surface of the second lens satisfy: $2.0<R2/R3<4.0$. By reasonably setting the proportional relationship between the radius of curvature of the image-side surface of the first lens and the radius of curvature of the object-side surface of the second lens, it is beneficial to control the light convergence ability of the first lens. At the same time, the ratio of the radius of curvature of the image-side surface of the first lens to the radius of curvature of the object-side surface of the second lens is in the range from 2 to 4, such that the refractive power of the first lens is relatively small, which is beneficial to better correcting the aberration of the optical imaging lens assembly.

In an exemplary embodiment, the above optical imaging lens assembly may further include a stop. The stop may be disposed at an appropriate position as required. For example, the stop may be disposed between the object side and the first lens. Optionally, the above optical imaging lens assembly may further include an optical filter for correcting the color deviation and/or a protective glass for protecting the photosensitive element located on an imaging plane.

In an exemplary embodiment, at least one of the surfaces of lenses is aspheric, that is, at least one of the object-side surface of the first lens to the image-side surface of the third lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, the object-side surface and the image-side surface of the first lens are aspheric.

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

Exemplary embodiments of the present disclosure further provide an electronic device including the imaging apparatus described above.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking three lenses as an example, the optical imaging lens assembly is not limited to include three lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2D. FIG. 1 is a schematic structural view of the optical imaging lens assembly according to example 1 of the present disclosure.

As shown in FIG. 1, the optical imaging lens assembly includes a stop STO, a first lens E1, a second lens E2, a third lens E3, an optical filter E4 and an imaging plane S9, which are sequentially arranged from an object side to an image side along an optical axis.

The first lens E1 has positive refractive power, an object-side surface S1 thereof is a convex surface, and an image-side surface S2 thereof is a convex surface. The second lens E2 has negative refractive power, an object-side surface S3 thereof is a concave surface, and an image-side surface S4 thereof is a convex surface. The third lens E3 has positive refractive power, an object-side surface S5 thereof is a convex surface, and an image-side surface S6 thereof is a concave surface. The optical filter E4 has an object-side surface S7 and an image-side surface S8. Light from an object sequentially passes through the respective surfaces S1 to S8 and is finally imaged on the imaging plane S9.

Table 1 is a table illustrating basic parameters of the optical imaging lens assembly of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | 0.0522 | | | | |
| S1 | Aspheric | 6.7009 | 0.4458 | 1.55 | 56.1 | 1.77 | 95.5511 |
| S2 | Aspheric | −1.1062 | 0.5905 | | | | −0.7802 |
| S3 | Aspheric | −0.3010 | 0.2200 | 1.68 | 19.3 | −1.04 | −0.9856 |
| S4 | Aspheric | −0.6785 | 0.0300 | | | | −0.8672 |
| S5 | Aspheric | 0.5960 | 0.9449 | 1.55 | 56.1 | 1.12 | −0.8914 |
| S6 | Aspheric | 11.7479 | 0.1968 | | | | 0.0000 |
| S7 | Spherical | Infinite | 0.2100 | 1.52 | 64.2 | | |
| S8 | Spherical | Infinite | 0.4181 | | | | |
| S9 | Spherical | Infinite | | | | | |

In this example, a total effective focal length f of the optical imaging lens assembly satisfies f=1.81 mm, a distance TTL along the optical axis from the object-side surface S1 of the first lens E1 to the imaging plane S9 satisfies TTL=3.06 mm, half of a diagonal length ImgH of an effective pixel area on the imaging plane S9 satisfies ImgH=1.40 mm, half of a maximal field-of-view Semi-FOV of the optical imaging lens assembly satisfies HFOV=36.9°, and an aperture number Fno of the optical imaging lens assembly satisfies Fno=2.55.

The object-side surface and the image-side surface of any one of the first lens E1 to the third lens E3 are aspheric. The surface shape x of each aspheric lens may be defined by using, but not limited to, the following aspheric formula:

$$x = \frac{ch^2}{1 + \sqrt{1 - (k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S6 in example 1.

TABLE 2

| Surface number | A4 | A6 | A8 | A10 | A12 | A14 | A16 | A18 | A20 |
|---|---|---|---|---|---|---|---|---|---|
| S1 | −5.30E−01 | −5.74E+00 | 1.58E+02 | −1.58E+03 | −3.07E+04 | 1.00E+06 | −1.11E+07 | 5.65E+07 | −1.12E+08 |
| S2 | −2.30E−01 | −1.33E+01 | 3.13E+02 | −4.83E+03 | 4.82E+04 | −3.06E+05 | 1.19E+06 | −2.58E+06 | 2.38E+06 |
| S3 | 7.14E+00 | −8.24E+01 | 6.16E+02 | −2.35E+03 | 3.32E+03 | 8.35E+03 | −4.52E+04 | 7.72E+04 | −4.87E+04 |
| S4 | 1.76E+00 | −2.33E+01 | 1.29E+02 | −3.52E+02 | 5.53E+02 | −4.86E+02 | 1.88E+02 | 0.00E+00 | 0.00E+00 |
| S5 | −2.19E+00 | 5.04E+00 | −8.76E+00 | 1.10E+01 | −1.00E+01 | 6.37E+00 | −2.67E+00 | 6.63E−01 | −7.34E−02 |
| S6 | 6.87E−01 | −2.85E+00 | 5.65E+00 | −6.80E+00 | 5.23E+00 | −2.58E+00 | 7.83E−01 | −1.33E−01 | 9.52E−03 |

Figures 2A, 2B:
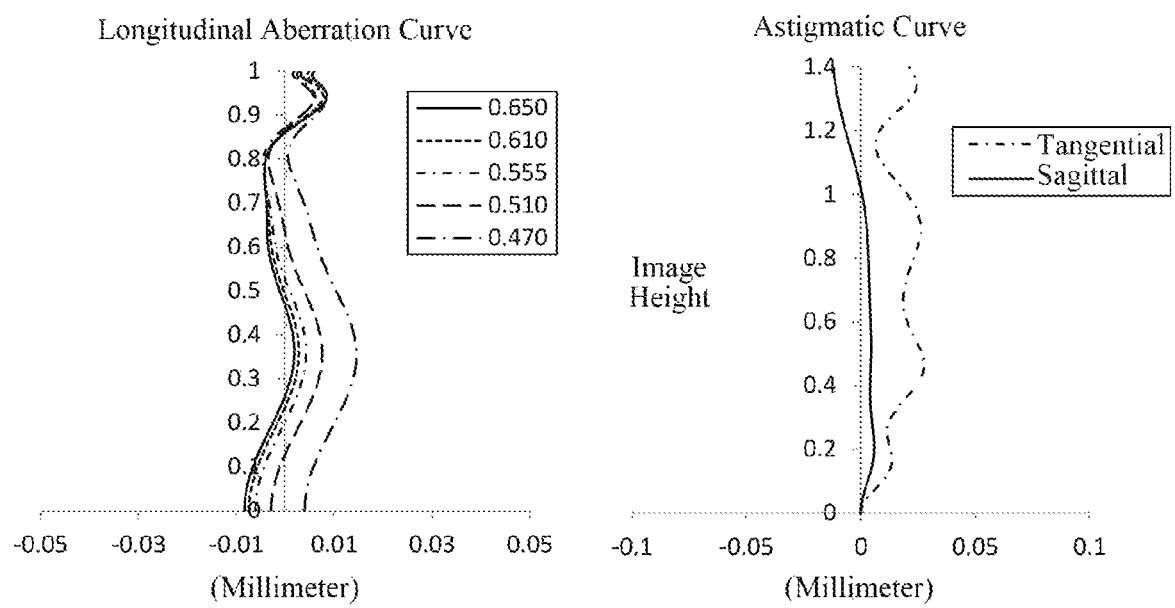
FIGS. 2A to 2D illustrate a longitudinal aberration curve, an astigmatic curve, a distortion curve, and a lateral color curve of the optical imaging lens assembly of the example 1, respectively.
Figure 2C:
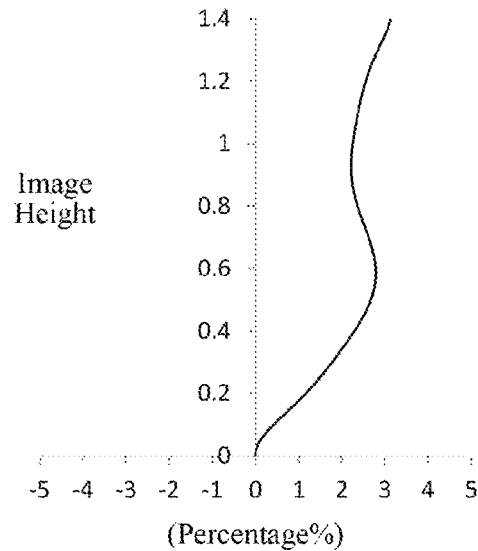
Figure 2D:
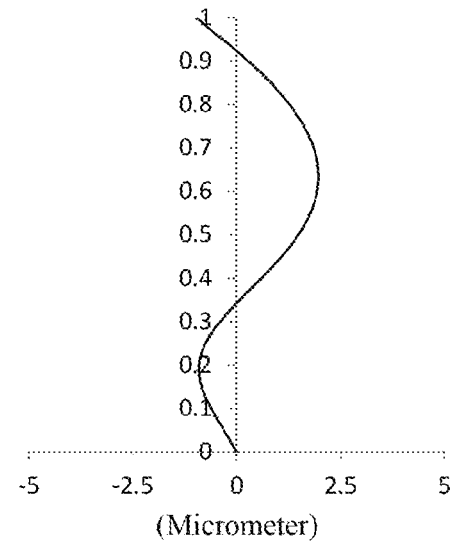

FIG. 2A illustrates a longitudinal aberration curve of the optical imaging lens assembly according to example 1, representing deviations of focal points converged by light of different wavelengths after passing through the lens assembly. FIG. 2B illustrates an astigmatic curve of the optical imaging lens assembly according to example 1, representing a curvature of a tangential plane and a curvature of a sagittal plane. FIG. 2C illustrates a distortion curve of the optical imaging lens assembly according to example 1, representing amounts of distortion corresponding to different image heights. FIG. 2D illustrates a lateral color curve of the optical imaging lens assembly according to example 1, representing deviations of different image heights on an imaging plane after light passes through the lens assembly. It can be seen from FIG. 2A to FIG. 2D that the optical imaging lens assembly provided in example 1 may achieve good image quality.

Example 2

Figure 3:
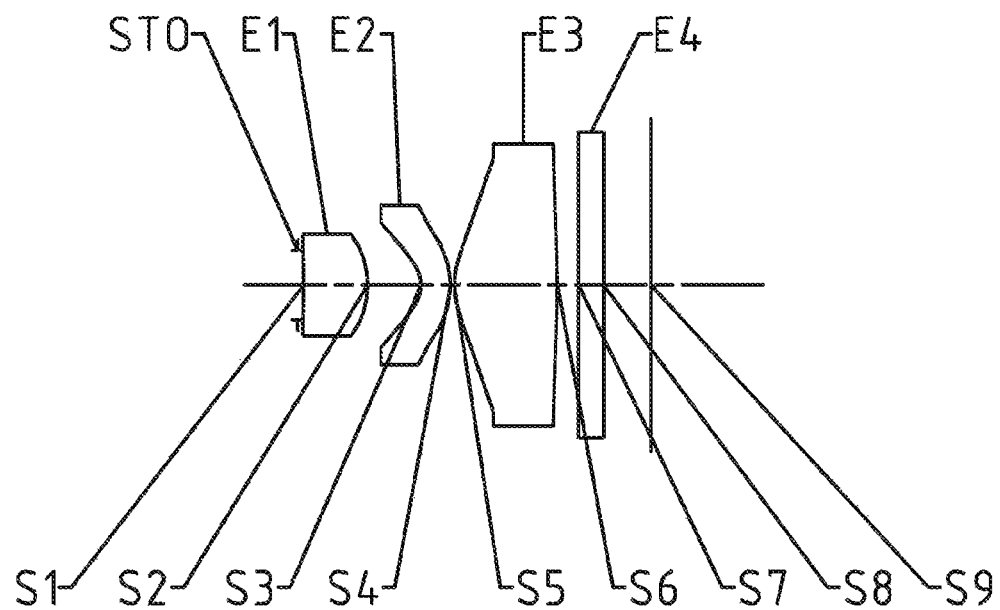
FIG. 3 illustrates a schematic structural view of an optical imaging lens assembly according to example 2 of the present disclosure.

An optical imaging lens assembly according to example 2 of the present disclosure is described below with reference to FIG. 3 to FIG. 4D. FIG. 3 shows a schematic structural view of the optical imaging lens assembly according to example 2 of the present disclosure.

As shown in FIG. 3, the optical imaging lens assembly includes a stop STO, a first lens E1, a second lens E2, a third lens E3, an optical filter E4 and an imaging plane S9, which are sequentially arranged from an object side to an image side along an optical axis.

The first lens E1 has positive refractive power, an object-side surface S1 thereof is a convex surface, and an image-side surface S2 thereof is a convex surface. The second lens E2 has negative refractive power, an object-side surface S3 thereof is a concave surface, and an image-side surface S4 thereof is a convex surface. The third lens E3 has positive refractive power, an object-side surface S5 thereof is a convex surface, and an image-side surface S6 thereof is a convex surface. The optical filter E4 has an object-side surface S7 and an image-side surface S8. Light from an object sequentially passes through the respective surfaces S1 to S8 and is finally imaged on the imaging plane S9.

In this example, a total effective focal length f of the optical imaging lens assembly satisfies f=1.49 mm, a distance TTL along the optical axis from the object-side surface S1 of the first lens E1 to the imaging plane S9 satisfies TTL=2.91 mm, half of a diagonal length ImgH of an effective pixel area on the imaging plane S9 satisfies ImgH=1.40 mm, half of a maximal field-of-view Semi-FOV of the optical imaging lens assembly satisfies HFOV=42.3°, and an aperture number Fno of the optical imaging lens assembly satisfies Fno=2.55.

Table 3 is a table illustrating basic parameters of the optical imaging lens assembly of example 2, wherein the units for the radius of curvature, the thickness/distance and the focal length are millimeter (mm).

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | 0.0550 | | | | |
| S1 | Aspheric | 20.0270 | 0.5386 | 1.55 | 56.1 | 1.34 | 99.0000 |
| S2 | Aspheric | −0.7527 | 0.4499 | | | | −0.8839 |
| S3 | Aspheric | −0.2598 | 0.2495 | 1.68 | 19.3 | −0.85 | −0.9973 |
| S4 | Aspheric | −0.6543 | 0.0300 | | | | −0.7851 |
| S5 | Aspheric | 0.6000 | 0.8700 | 1.55 | 56.1 | 1.01 | −0.8963 |
| S6 | Aspheric | −3.3689 | 0.1793 | | | | 0.0000 |
| S7 | Spherical | Infinite | 0.2100 | 1.52 | 64.2 | | |
| S8 | Spherical | Infinite | 0.3999 | | | | |
| S9 | Spherical | Infinite | | | | | |

In example 2, the object-side surface and the image-side surface of any one of the first lens E1 to the third lens E3 are aspheric. Table 4 below shows high-order coefficients A4, A6, A8, A10, A12, A14, A16, A18 and A20 applicable to each aspheric surface S1 to S6 in example 2.

TABLE 4

| Surface number | A4 | A6 | A8 | A10 | A12 | A14 | A16 | A18 | A20 |
|---|---|---|---|---|---|---|---|---|---|
| S1 | −8.03E−01 | 8.15E+00 | −2.11E+02 | −1.78E+03 | 1.66E+05 | −2.91E+06 | 2.00E+07 | −2.69E+07 | −1.67E+08 |
| S2 | 1.80E−01 | −3.33E+01 | 8.79E+02 | −1.44E+04 | 1.49E+05 | −9.67E+05 | 3.86E+06 | −8.62E+06 | 8.26E+06 |
| S3 | 7.64E+00 | −9.26E+01 | 6.61E+02 | −1.09E+03 | −1.61E+04 | 1.33E+05 | −4.67E+05 | 8.21E+05 | −5.88E+05 |
| S4 | 1.84E+00 | −2.47E+01 | 1.42E+02 | −4.25E+02 | 7.44E+02 | −7.26E+02 | 3.04E+02 | 0.00E+00 | 0.00E+00 |
| S5 | −2.07E+00 | 4.79E+00 | −8.72E+00 | 1.19E+01 | −1.19E+01 | 8.40E+00 | −3.91E+00 | 1.06E+00 | −1.28E−01 |
| S6 | 7.51E−01 | −2.19E+00 | 3.52E+00 | −3.02E+00 | 1.03E+00 | 3.74E−01 | −4.93E−01 | 1.78E−01 | −2.30E−02 |

Figure 4A:
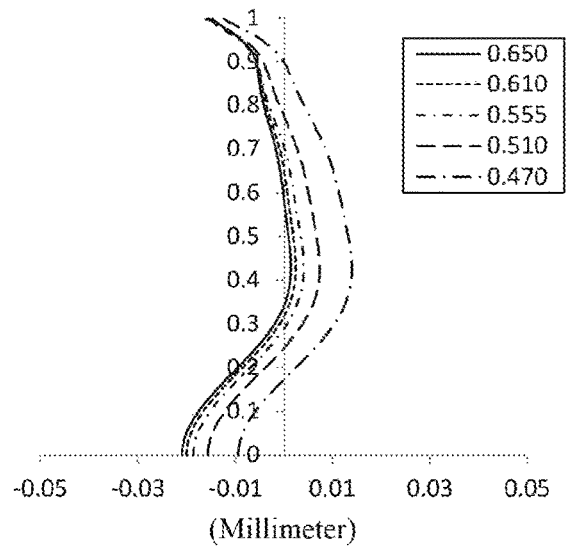
FIGS. 4A to 4D illustrate a longitudinal aberration curve, an astigmatic curve, a distortion curve, and a lateral color curve of the optical imaging lens assembly of the example 2, respectively.
Figure 4B:
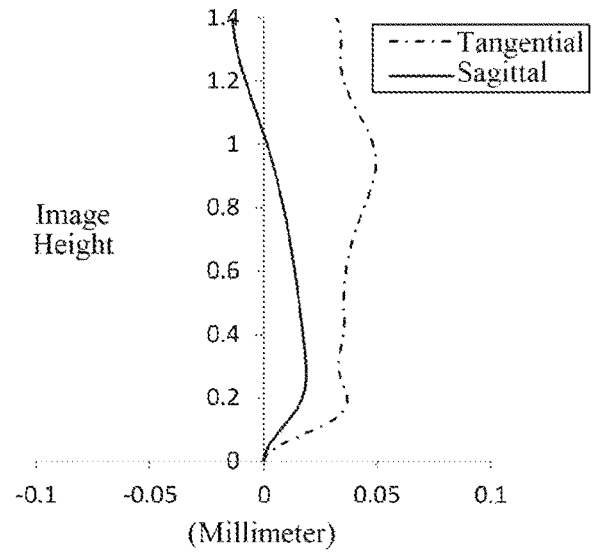
Figure 4C:
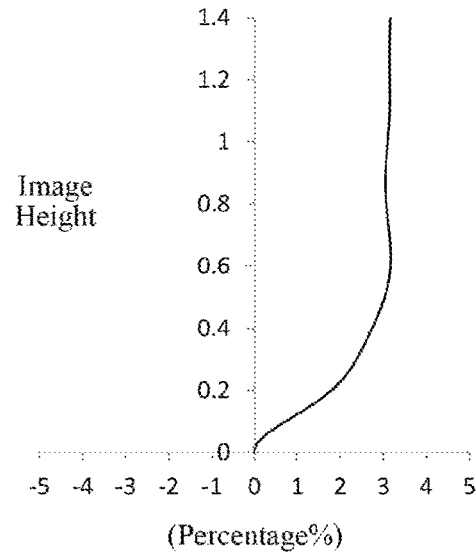
Figure 4D:
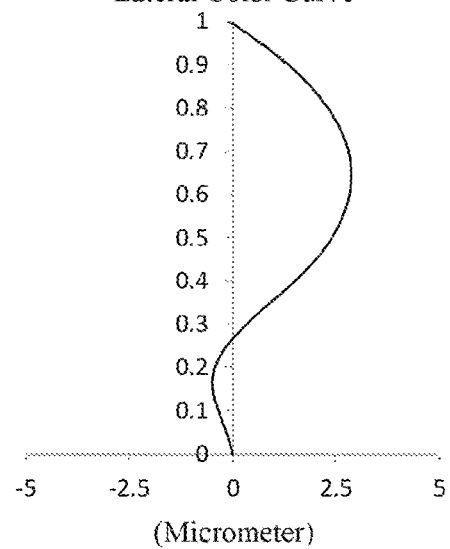

FIG. 4A illustrates a longitudinal aberration curve of the optical imaging lens assembly according to example 2, representing deviations of focal points converged by light of different wavelengths after passing through the lens assembly. FIG. 4B illustrates an astigmatic curve of the optical imaging lens assembly according to example 2, representing a curvature of a tangential plane and a curvature of a sagittal plane. FIG. 4C illustrates a distortion curve of the optical imaging lens assembly according to example 2, representing amounts of distortion corresponding to different image heights. FIG. 4D illustrates a lateral color curve of the optical imaging lens assembly according to example 2, representing deviations of different image heights on an imaging plane after light passes through the lens assembly. It can be seen from FIG. 4A to FIG. 4D that the optical imaging lens assembly provided in example 2 may achieve good image quality.

Example 3

Figure 5:
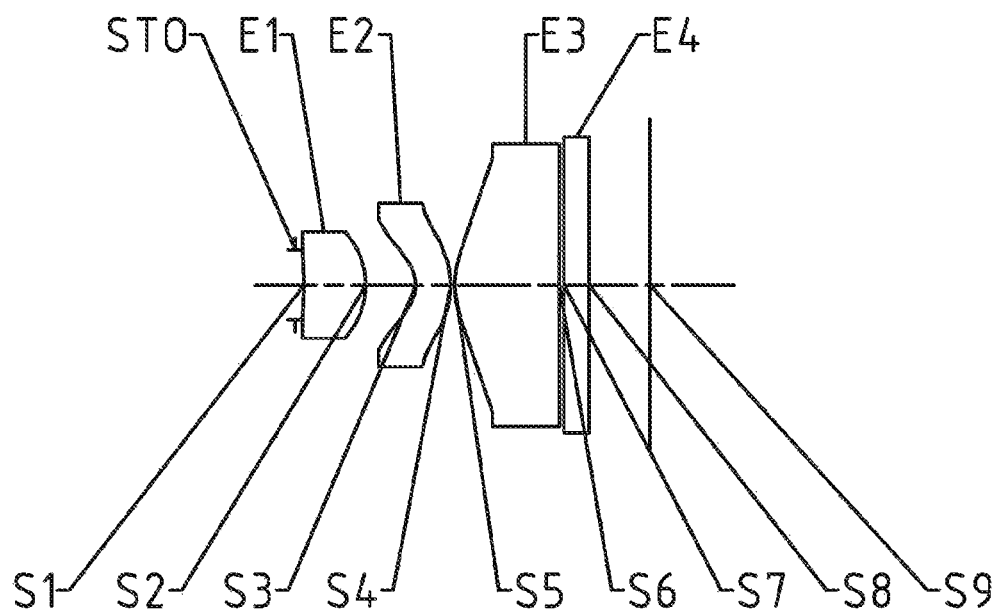
FIG. 5 illustrates a schematic structural view of an optical imaging lens assembly according to example 3 of the present disclosure.

An optical imaging lens assembly according to example 3 of the present disclosure is described below with reference to FIG. 5 to FIG. 6D. FIG. 5 shows a schematic structural view of the optical imaging lens assembly according to example 3 of the present disclosure.

As shown in FIG. 5, the optical imaging lens assembly includes a stop STO, a first lens E1, a second lens E2, a third lens E3, an optical filter E4 and an imaging plane S9, which are sequentially arranged from an object side to an image side along an optical axis.

The first lens E1 has positive refractive power, an object-side surface S1 thereof is a concave surface, and an image-side surface S2 thereof is a convex surface. The second lens E2 has negative refractive power, an object-side surface S3 thereof is a concave surface, and an image-side surface S4 thereof is a convex surface. The third lens E3 has positive refractive power, an object-side surface S5 thereof is a convex surface, and an image-side surface S6 thereof is a convex surface. The optical filter E4 has an object-side surface S7 and an image-side surface S8. Light from an object sequentially passes through the respective surfaces S1 to S8 and is finally imaged on the imaging plane S9.

In this example, a total effective focal length f of the optical imaging lens assembly satisfies f=1.51 mm, a distance TTL along the optical axis from the object-side surface S1 of the first lens E1 to the imaging plane S9 satisfies TTL=3.20 mm, half of a diagonal length ImgH of an effective pixel area on the imaging plane S9 satisfies ImgH=1.40 mm, half of a maximal field-of-view Semi-FOV of the optical imaging lens assembly satisfies HFOV=42.5°, and an aperture number Fno of the optical imaging lens assembly satisfies Fno=2.55.

Table 5 is a table illustrating basic parameters of the optical imaging lens assembly of example 3, wherein the units for the radius of curvature, the thickness/distance and the focal length are millimeter (mm).

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 370.0000 | | | | |
| STO | Spherical | Infinite | 0.0753 | | | | |
| S1 | Aspheric | −56.1052 | 0.5210 | 1.55 | 56.1 | 1.23 | 0.0000 |
| S2 | Aspheric | −0.6636 | 0.4218 | | | | −0.9124 |
| S3 | Aspheric | −0.2692 | 0.2938 | 1.68 | 19.3 | −0.88 | −1.0121 |
| S4 | Aspheric | −0.7050 | 0.0300 | | | | −0.8499 |
| S5 | Aspheric | 0.6431 | 0.8814 | 1.55 | 56.1 | 1.11 | −0.8736 |
| S6 | Aspheric | −5.4755 | 0.0414 | | | | 10.7435 |
| S7 | Spherical | Infinite | 0.2100 | 1.52 | 64.2 | | |
| S8 | Spherical | Infinite | 0.5303 | | | | |
| S9 | Spherical | Infinite | | | | | |

In example 3, the object-side surface and the image-side surface of any one of the first lens E1 to the third lens E3 are aspheric. Table 6 below shows high-order coefficients A4, A6, A8, A10, A12, A14, A16, A18 and A20 applicable to each aspheric surface S1 to S6 in example 3.

TABLE 6

| Surface number | A4 | A6 | A8 | A10 | A12 | A14 | A16 | A18 | A20 |
|---|---|---|---|---|---|---|---|---|---|
| S1 | −9.66E−01 | 1.25E+01 | −6.50E+02 | 1.52E+04 | −1.94E+05 | 1.28E+06 | −3.41E+06 | 0.00E+00 | 0.00E+00 |
| S2 | −3.81E−01 | −3.38E+00 | 3.21E+01 | −1.06E+02 | −4.14E+02 | 3.83E+03 | −7.21E+03 | 0.00E+00 | 0.00E+00 |
| S3 | 5.95E+00 | −6.52E+01 | 6.64E+02 | −4.31E+03 | 1.91E+04 | −5.93E+04 | 1.24E+05 | −1.56E+05 | 8.90E+04 |
| S4 | 9.81E−01 | −1.72E+01 | 1.38E+02 | −6.08E+02 | 1.73E+03 | −3.17E+03 | 3.47E+03 | −1.90E+03 | 3.14E+02 |
| S5 | −2.00E+00 | 4.96E+00 | −9.35E+00 | 1.24E+01 | −1.14E+01 | 7.12E+00 | −2.95E+00 | 7.64E−01 | −9.63E−02 |
| S6 | 7.40E−01 | −3.07E+00 | 7.73E+00 | −1.23E+01 | 1.27E+01 | −8.49E+00 | 3.50E+00 | −8.05E−01 | 7.85E−02 |

Figures 6A, 6B:
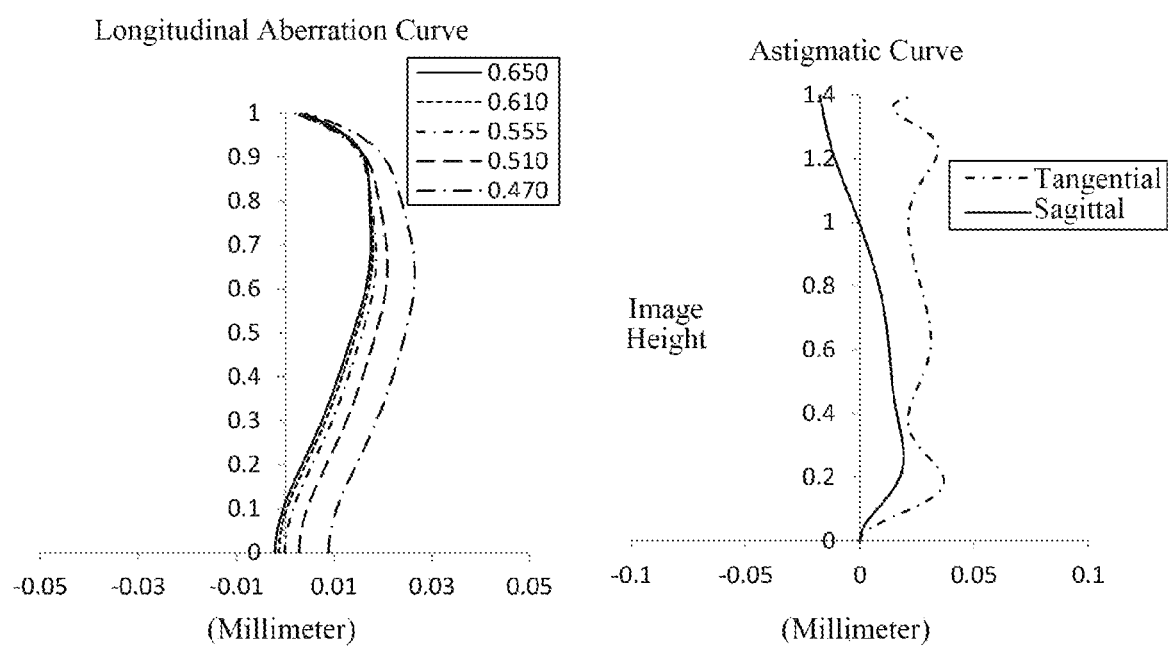
FIGS. 6A to 6D illustrate a longitudinal aberration curve, an astigmatic curve, a distortion curve, and a lateral color curve of the optical imaging lens assembly of the example 3, respectively.
Figure 6C:
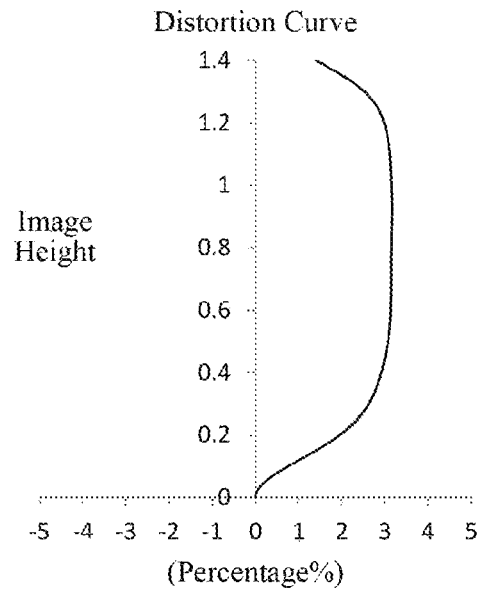
Figure 6D:
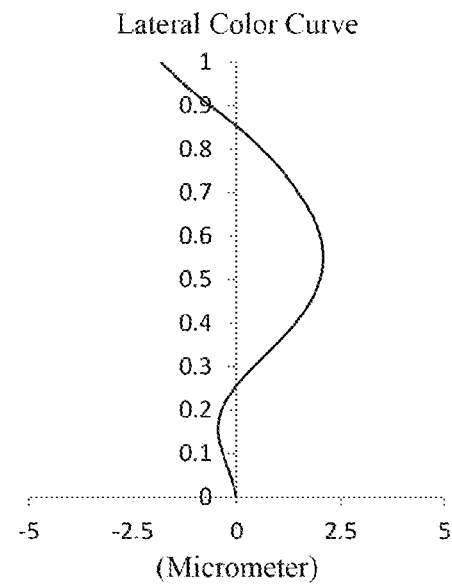

FIG. 6A illustrates a longitudinal aberration curve of the optical imaging lens assembly according to example 3, representing deviations of focal points converged by light of different wavelengths after passing through the lens assembly. FIG. 6B illustrates an astigmatic curve of the optical imaging lens assembly according to example 3, representing a curvature of a tangential plane and a curvature of a sagittal plane. FIG. 6C illustrates a distortion curve of the optical imaging lens assembly according to example 3, representing amounts of distortion corresponding to different image heights. FIG. 6D illustrates a lateral color curve of the optical imaging lens assembly according to example 3, representing deviations of different image heights on an imaging plane after light passes through the lens assembly. It can be seen from FIG. 6A to FIG. 6D that the optical imaging lens assembly provided in example 3 may achieve good image quality.

Example 4

Figure 7:
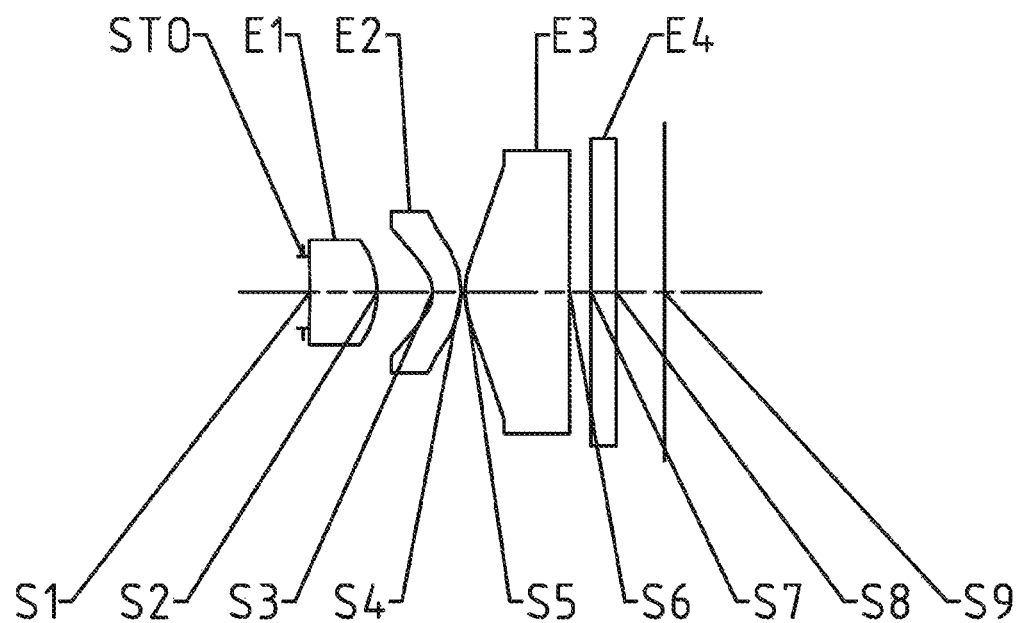
FIG. 7 illustrates a schematic structural view of an optical imaging lens assembly according to example 4 of the present disclosure.

An optical imaging lens assembly according to example 4 of the present disclosure is described below with reference to FIG. 7 to FIG. 8D. FIG. 7 shows a schematic structural view of the optical imaging lens assembly according to example 4 of the present disclosure.

As shown in FIG. 7, the optical imaging lens assembly includes a stop STO, a first lens E1, a second lens E2, a third lens E3, an optical filter E4 and an imaging plane S9, which are sequentially arranged from an object side to an image side along an optical axis.

The first lens E1 has positive refractive power, an object-side surface S1 thereof is a convex surface, and an image-side surface S2 thereof is a convex surface. The second lens E2 has negative refractive power, an object-side surface S3 thereof is a concave surface, and an image-side surface S4 thereof is a convex surface. The third lens E3 has positive refractive power, an object-side surface S5 thereof is a convex surface, and an image-side surface S6 thereof is a convex surface. The optical filter E4 has an object-side surface S7 and an image-side surface S8. Light from an object sequentially passes through the respective surfaces S1 to S8 and is finally imaged on the imaging plane S9.

In this example, a total effective focal length f of the optical imaging lens assembly satisfies f=1.52 mm, a distance TTL along the optical axis from the object-side surface S1 of the first lens E1 to the imaging plane S9 satisfies TTL=2.91 mm, half of a diagonal length ImgH of an effective pixel area on the imaging plane S9 satisfies ImgH=1.40 mm, half of a maximal field-of-view Semi-FOV of the optical imaging lens assembly satisfies HFOV=41.7°, and an aperture number Fno of the optical imaging lens assembly satisfies Fno=2.55.

Table 7 is a table illustrating basic parameters of the optical imaging lens assembly of example 4, wherein the units for the radius of curvature, the thickness/distance and the focal length are millimeter (mm).

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | 0.0544 | | | | |
| S1 | Aspheric | 16.0520 | 0.5561 | 1.55 | 56.1 | 1.36 | 99.0000 |
| S2 | Aspheric | −0.7706 | 0.4593 | | | | −0.9099 |
| S3 | Aspheric | −0.2594 | 0.2352 | 1.68 | 19.3 | −0.85 | −0.9971 |
| S4 | Aspheric | −0.6435 | 0.0300 | | | | −0.7873 |
| S5 | Aspheric | 0.5903 | 0.8633 | 1.55 | 56.1 | 1.01 | −0.9026 |
| S6 | Aspheric | −3.8735 | 0.1766 | | | | 0.0000 |
| S7 | Spherical | Infinite | 0.2100 | 1.52 | 64.2 | | |
| S8 | Spherical | Infinite | 0.3967 | | | | |
| S9 | Spherical | Infinite | | | | | |

In example 4, the object-side surface and the image-side surface of any one of the first lens E1 to the third lens E3 are aspheric. Table 8 below shows high-order coefficients A4, A6, A8, A10, A12, A14, A16, A18 and A20 applicable to each aspheric surface S1 to S6 in example 4.

TABLE 8

| Surface number | A4 | A6 | A8 | A10 | A12 | A14 | A16 | A18 | A20 |
|---|---|---|---|---|---|---|---|---|---|
| S1 | −8.65E−01 | 1.89E+01 | −8.17E+02 | 1.90E+04 | −2.77E+05 | 2.86E+06 | −2.40E+07 | 1.45E+08 | −4.16E+08 |
| S2 | 7.90E−02 | −2.55E+01 | 6.28E+02 | −9.71E+03 | 9.50E+04 | −5.86E+05 | 2.21E+06 | −4.68E+06 | 4.23E+06 |
| S3 | 7.44E+00 | −8.53E+01 | 5.96E+02 | −1.29E+03 | −9.19E+03 | 8.20E+04 | −2.85E+05 | 4.88E+05 | −3.39E+05 |
| S4 | 1.67E+00 | −2.23E+01 | 1.27E+02 | −3.76E+02 | 6.62E+02 | −6.62E+02 | 2.88E+02 | 0.00E+00 | 0.00E+00 |
| S5 | −2.18E+00 | 5.66E+00 | −1.24E+01 | 2.09E+01 | −2.58E+01 | 2.20E+01 | −1.22E+01 | 3.95E+00 | −5.62E−01 |
| S6 | 8.87E−01 | −2.72E+00 | 4.80E+00 | −5.21E+00 | 3.51E+00 | −1.40E+00 | 2.79E−01 | −8.49E−03 | −3.89E−03 |

Figure 8A:
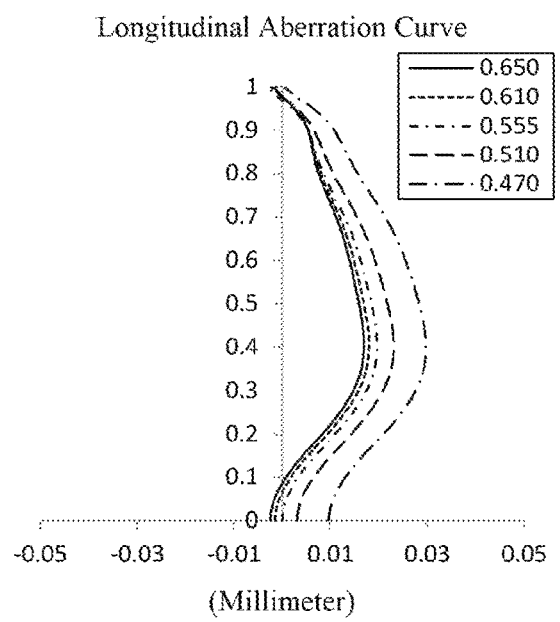
FIGS. 8A to 8D illustrate a longitudinal aberration curve, an astigmatic curve, a distortion curve, and a lateral color curve of the optical imaging lens assembly of the example 4, respectively.
Figure 8B:
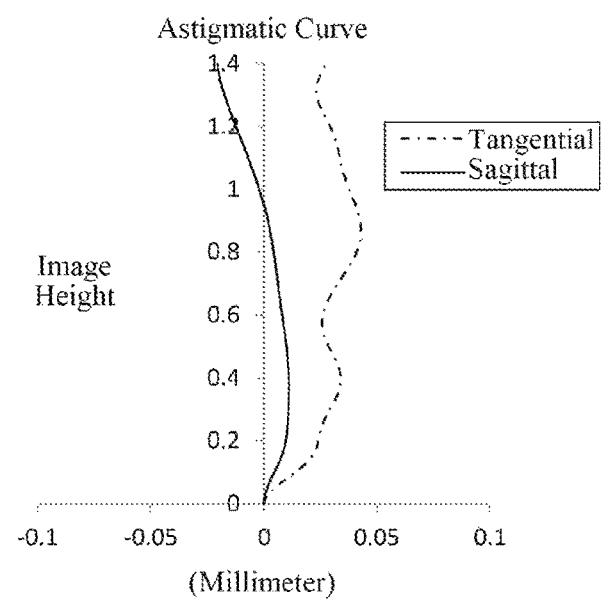
Figure 8C:
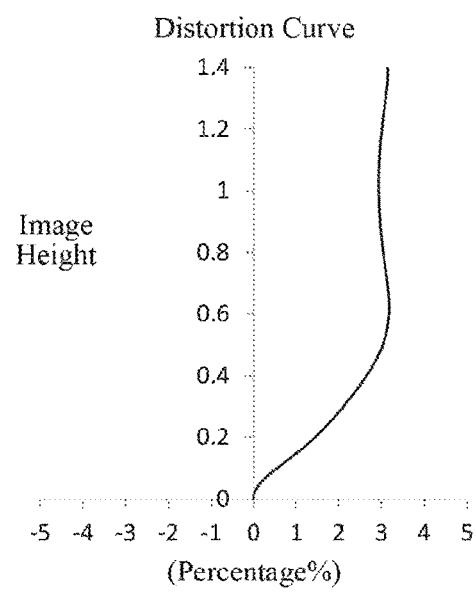
Figure 8D:
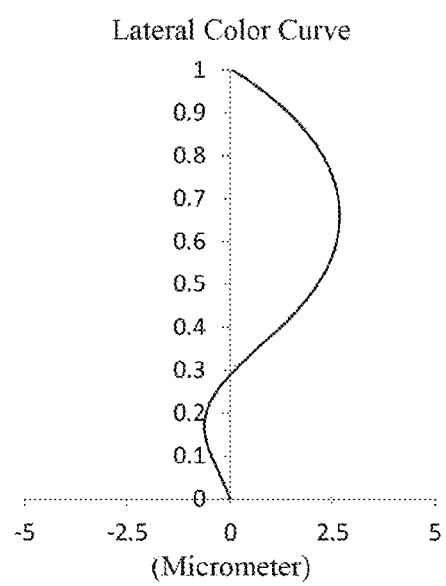

FIG. 8A illustrates a longitudinal aberration curve of the optical imaging lens assembly according to example 4, representing deviations of focal points converged by light of different wavelengths after passing through the lens assembly. FIG. 8B illustrates an astigmatic curve of the optical imaging lens assembly according to example 4, representing a curvature of a tangential plane and a curvature of a sagittal plane. FIG. 8C illustrates a distortion curve of the optical imaging lens assembly according to example 4, representing amounts of distortion corresponding to different image heights. FIG. 8D illustrates a lateral color curve of the optical imaging lens assembly according to example 4, representing deviations of different image heights on an imaging plane after light passes through the lens assembly. It can be seen from FIG. 8A to FIG. 8D that the optical imaging lens assembly provided in example 4 may achieve good image quality.

Example 5

Figure 9:
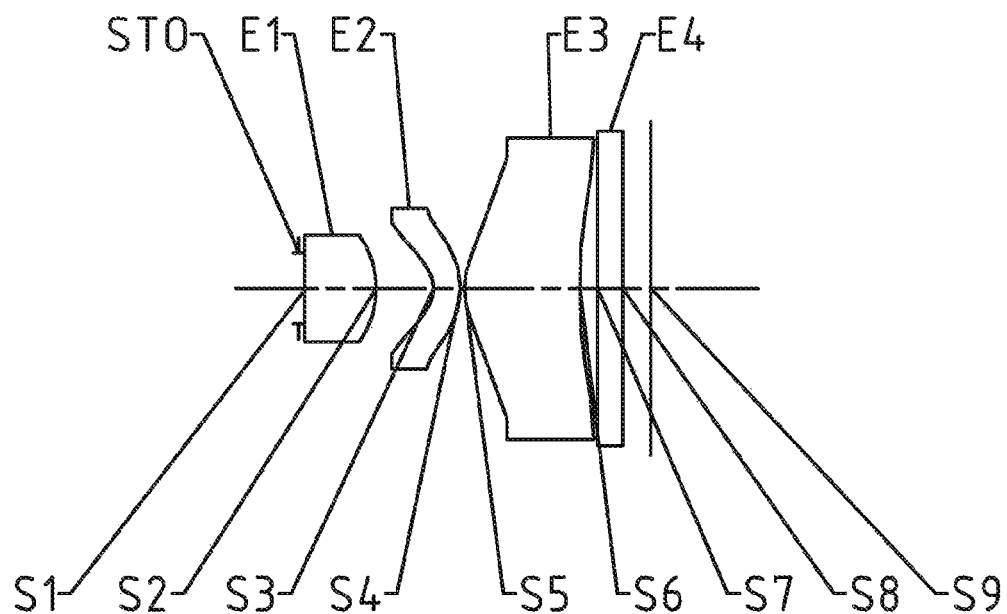
FIG. 9 illustrates a schematic structural view of an optical imaging lens assembly according to example 5 of the present disclosure.

An optical imaging lens assembly according to example 5 of the present disclosure is described below with reference to FIG. 9 to FIG. 10D. FIG. 9 shows a schematic structural view of the optical imaging lens assembly according to example 5 of the present disclosure.

As shown in FIG. 9, the optical imaging lens assembly includes a stop STO, a first lens E1, a second lens E2, a third lens E3, an optical filter E4 and an imaging plane S9, which are sequentially arranged from an object side to an image side along an optical axis.

The first lens E1 has positive refractive power, an object-side surface S1 thereof is a convex surface, and an image-side surface S2 thereof is a convex surface. The second lens E2 has negative refractive power, an object-side surface S3 thereof is a concave surface, and an image-side surface S4 thereof is a convex surface. The third lens E3 has positive refractive power, an object-side surface S5 thereof is a convex surface, and an image-side surface S6 thereof is a convex surface. The optical filter E4 has an object-side surface S7 and an image-side surface S8. Light from an object sequentially passes through the respective surfaces S1 to S8 and is finally imaged on the imaging plane S9.

In this example, a total effective focal length f of the optical imaging lens assembly satisfies f=1.51 mm, a distance TTL along the optical axis from the object-side surface S1 of the first lens E1 to the imaging plane S9 satisfies TTL=2.89 mm, half of a diagonal length ImgH of an effective pixel area on the imaging plane S9 satisfies ImgH=1.40 mm, half of a maximal field-of-view Semi-FOV of the optical imaging lens assembly satisfies HFOV=41.9°, and an aperture number Fno of the optical imaging lens assembly satisfies Fno=2.55.

Table 9 is a table illustrating basic parameters of the optical imaging lens assembly of example 5, wherein the units for the radius of curvature, the thickness/distance and the focal length are millimeter (mm).

TABLE 9

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | 0.0495 | | | | |
| S1 | Aspheric | 7.4126 | 0.5982 | 1.55 | 56.1 | 1.38 | 99.0000 |
| S2 | Aspheric | −0.8180 | 0.4788 | | | | −0.9675 |
| S3 | Aspheric | −0.2630 | 0.2274 | 1.68 | 19.3 | −0.90 | −0.9960 |
| S4 | Aspheric | −0.6213 | 0.0300 | | | | −0.8069 |
| S5 | Aspheric | 0.5603 | 0.9659 | 1.55 | 56.1 | 1.02 | −0.9072 |
| S6 | Aspheric | −24.4445 | 0.1474 | | | | 0.0000 |
| S7 | Spherical | Infinite | 0.2100 | 1.52 | 64.2 | | |
| S8 | Spherical | Infinite | 0.2348 | | | | |
| S9 | Spherical | Infinite | | | | | |

In example 5, the object-side surface and the image-side surface of any one of the first lens E1 to the third lens E3 are aspheric. Table 10 below shows high-order coefficients A4, A6, A8, A10, A12, A14, A16, A18 and A20 applicable to each aspheric surface S1 to S6 in example 5.

TABLE 10

| Surface number | A4 | A6 | A8 | A10 | A12 | A14 | A16 | A18 | A20 |
|---|---|---|---|---|---|---|---|---|---|
| S1 | −5.99E−01 | −2.17E+00 | 3.13E+02 | −1.55E+04 | 3.56E+05 | −4.09E+06 | 1.96E+07 | 9.80E+06 | −2.81E+08 |
| S2 | −1.07E−01 | −1.44E+01 | 3.34E+02 | −4.93E+03 | 4.63E+04 | −2.74E+05 | 9.95E+05 | −2.03E+06 | 1.78E+06 |
| S3 | 7.47E+00 | −8.35E+01 | 5.79E+02 | −1.51E+03 | −4.73E+03 | 5.10E+04 | −1.73E+05 | 2.82E+05 | −1.85E+05 |
| S4 | 1.60E+00 | −2.19E+01 | 1.26E+02 | −3.68E+02 | 6.30E+02 | −6.04E+02 | 2.50E+02 | 0.00E+00 | 0.00E+00 |
| S5 | −2.34E+00 | 6.10E+00 | −1.28E+01 | 2.01E+01 | −2.29E+01 | 1.80E+01 | −9.16E+00 | 2.71E+00 | −3.53E−01 |
| S6 | 1.09E+00 | −3.95E+00 | 7.97E+00 | −1.00E+01 | 8.11E+00 | −4.24E+00 | 1.39E+00 | −2.58E−01 | 2.08E−02 |

Figures 10A, 10B:
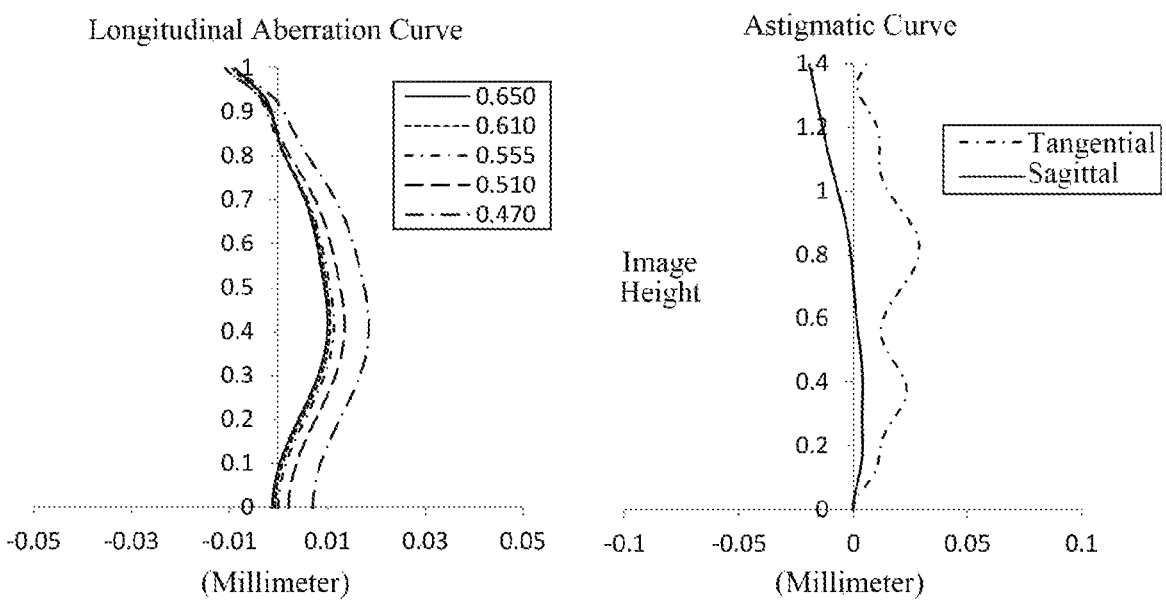
FIGS. 10A to 10D illustrate a longitudinal aberration curve, an astigmatic curve, a distortion curve, and a lateral color curve of the optical imaging lens assembly of the example 5, respectively.
Figure 10C:
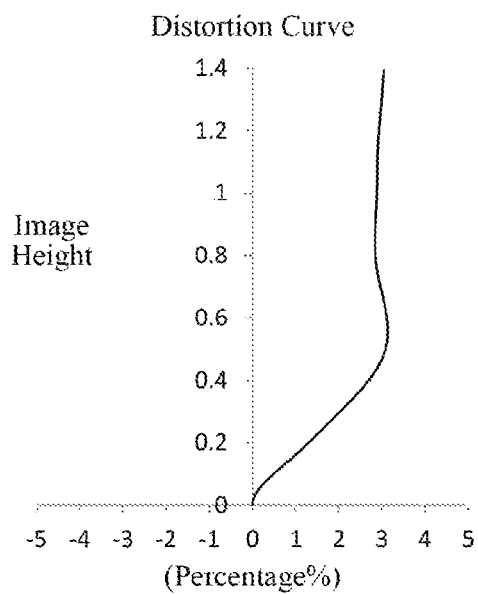
Figure 10D:
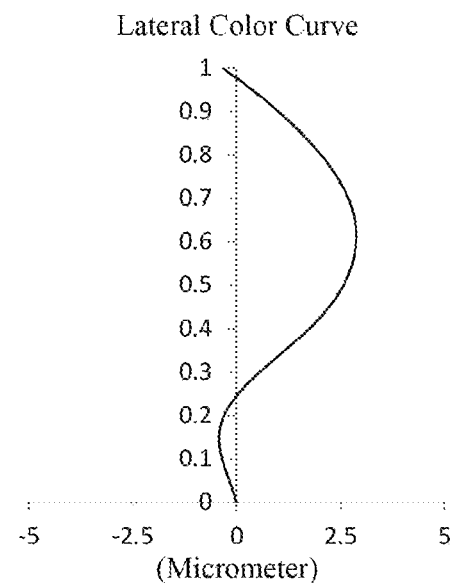

FIG. 10A illustrates a longitudinal aberration curve of the optical imaging lens assembly according to example 5, representing deviations of focal points converged by light of different wavelengths after passing through the lens assembly. FIG. 10B illustrates an astigmatic curve of the optical imaging lens assembly according to example 5, representing a curvature of a tangential plane and a curvature of a sagittal plane. FIG. 10C illustrates a distortion curve of the optical imaging lens assembly according to example 5, representing amounts of distortion corresponding to different image heights. FIG. 10D illustrates a lateral color curve of the optical imaging lens assembly according to example 5, representing deviations of different image heights on an imaging plane after light passes through the lens assembly. It can be seen from FIG. 10A to FIG. 10D that the optical imaging lens assembly provided in example 5 may achieve good image quality.

In view of the above, examples 1 to 5 respectively satisfy the relationship shown in Table 11.

TABLE 11

| Condition | Example 1 | Example 2 | Example 3 | Example 4 | Example 5 |
|---|---|---|---|---|---|
| ETL (mm) | 2.24 | 2.13 | 2.15 | 2.14 | 2.30 |
| EIN (mm) | 3.06 | 2.93 | 2.94 | 2.93 | 2.89 |
| ETP1 (mm) | 0.38 | 0.48 | 0.46 | 0.50 | 0.54 |
| ETP2 (mm) | 0.30 | 0.33 | 0.37 | 0.31 | 0.30 |
| CT1/DT11 | 1.22 | 1.73 | 1.61 | 1.76 | 1.90 |
| CRAmax (°) | 18.6 | 19.7 | 20.7 | 21.6 | 22.6 |
| ETL/EIN | 1.36 | 1.37 | 1.37 | 1.37 | 1.26 |
| SAG21/SAG12 | 2.85 | 2.40 | 1.82 | 2.42 | 2.45 |
| |SAG22/SAG31| | 0.65 | 0.83 | 0.75 | 0.87 | 0.80 |
| CT1/ET1 | 1.31 | 1.34 | 1.54 | 1.33 | 1.31 |
| ET2/CT2 | 1.34 | 1.25 | 1.26 | 1.27 | 1.28 |
| CT3/ET3 | 1.49 | 1.73 | 1.56 | 1.59 | 1.33 |
| (ETP1 + ETP2)/CT1 | 1.52 | 1.50 | 1.59 | 1.46 | 1.40 |
| ETP3/ET3 | 1.38 | 1.60 | 1.46 | 1.46 | 1.25 |
| f/f1 | 1.02 | 1.11 | 1.23 | 1.12 | 1.09 |
| f23/f | 2.75 | 1.95 | 2.55 | 2.12 | 2.45 |
| R2/R3 | 3.67 | 2.90 | 2.46 | 2.97 | 3.11 |
| (R4 + R5)*100/(R4 − R5) | 6.48 | 4.33 | 4.59 | 4.31 | 5.16 |

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, sequentially from an object side to an image side of the optical imaging lens assembly along an optical axis, comprising:
    a first lens having positive refractive power with a convex image-side surface;

a second lens having negative refractive power with a concave object-side surface; and a third lens having a positive refractive power, wherein $1.0<CT1/DT11<2.0$, where CT1 is a center thickness of the first lens along the optical axis, and DT11 is a maximum effective radius of an object-side surface of the first lens; and $ETL/EIN<1.5$, where ETL is a distance parallel to the optical axis from the object-side surface of the first lens to an imaging plane of the optical imaging lens assembly at a 1/2 entrance pupil diameter, and EIN is a distance parallel to the optical axis from the object-side surface of the first lens to an image-side surface of the third lens at the 1/2 entrance pupil diameter.

2. The optical imaging lens assembly according to claim 1, wherein $15°<CRAmax<25°$, where CRAmax is a maximum incident angle of a chief ray incident onto an electronic photosensitive element of the optical imaging lens assembly.

3. The optical imaging lens assembly according to claim 1, wherein $1.5<SAG21/SAG12<3.0$, where SAG21 is an on-axis distance from an intersection of an object-side surface of the second lens and the optical axis to a vertex of an effective radius of the object-side surface of the second lens, and SAG12 is an on-axis distance from an intersection of an image-side surface of the first lens and the optical axis to a vertex of an effective radius of the image-side surface of the first lens.

4. The optical imaging lens assembly according to claim 1, wherein $0<|SAG22/SAG31|<1.0$, where SAG22 is an on-axis distance from an intersection of an image-side surface of the second lens and the optical axis to a vertex of an effective radius of the image-side surface of the second lens, and SAG31 is an on-axis distance from an intersection of an object-side surface of the third lens and the optical axis to a vertex of an effective radius of the object-side surface of the third lens.

5. The optical imaging lens assembly according to claim 1, wherein $1.0<CT1/ET1<2.0$, where CT1 is the center thickness of the first lens along the optical axis, and ET1 an edge thickness of the first lens.

6. The optical imaging lens assembly according to claim 1, wherein $1.0<ET2/CT2<1.5$, where ET2 is an edge thickness of the second lens, and CT2 is a center thickness of the second lens along the optical axis.

7. The optical imaging lens assembly according to claim 1, wherein $1.0<CT3/ET3<2.0$, where CT3 is a center thickness of the third lens along the optical axis, and ET3 is an edge thickness of the third lens.

8. The optical imaging lens assembly according to claim 1, wherein $1.0<(ETP1+ETP2)/CT1<2.0$, where ETP1 is a thickness of the first lens at a 1/2 entrance pupil diameter in a direction parallel to the optical axis, ETP2 is a thickness of the second lens at the 1/2 entrance pupil diameter in the direction parallel to the optical axis, and CT1 is the center thickness of the first lens along the optical axis.

9. The optical imaging lens assembly according to claim 1, wherein $1.0<ETP3/ET3<2.0$, where ETP3 is a thickness of the third lens at a 1/2 entrance pupil diameter in a direction parallel to the optical axis, and ET3 is an edge thickness of the third lens.

10. The optical imaging lens assembly according to claim 1, wherein $1.0<f/f1<1.5$, where f is a total effective focal length of the optical imaging lens assembly, and f1 is an effective focal length of the first lens.

11. The optical imaging lens assembly according to claim 1, wherein $1.5<f23/f<3.0$, where f23 is a combined focal length of the second lens and the third lens, and f is a total effective focal length of the optical imaging lens assembly.

12. The optical imaging lens assembly according to claim 1, wherein $2.0<R2/R3<4.0$, where R2 is a radius of curvature of an image-side surface of the first lens, and R3 is a radius of curvature of an object-side surface of the second lens.

13. An optical imaging lens assembly, sequentially from an object side to an image side of the optical imaging lens assembly along an optical axis, comprising:

a first lens having positive refractive power with a convex image-side surface;

a second lens having negative refractive power with a concave object-side surface; and a third lens having positive refractive power, wherein $4.0<(R4+R5)*100/(R4-R5)\leq 6.5$, where R4 is a radius of curvature of an image-side surface of the second lens, and R5 is a radius of curvature of an object-side surface of the third lens; and $ETL/EIN<1.5$, where ETL is a distance parallel to the optical axis from an object-side surface of the first lens to an imaging plane of the optical imaging lens assembly at a 1/2 entrance pupil diameter, and EIN is a distance parallel to the optical axis from the object-side surface of the first lens to an image-side surface of the third lens at the 1/2 entrance pupil diameter.

14. The optical imaging lens assembly according to claim 13, wherein $15°<CRAmax<25°$, where CRAmax is a maximum incident angle of a chief ray incident onto an electronic photosensitive element of the optical imaging lens assembly.

15. The optical imaging lens assembly according to claim 13, wherein $1.0<CT3/ET3<2.0$, and $1.0<ETP3/ET3<2.0$, where CT3 is a center thickness of the third lens along the optical axis, ET3 is an edge thickness of the third lens, and ETP3 is a thickness of the third lens at a 1/2 entrance pupil diameter in a direction parallel to the optical axis.

16. The optical imaging lens assembly according to claim 13, wherein $1.0<(ETP1+ETP2)/CT1<2.0$, where ETP1 is a thickness of the first lens at a 1/2 entrance pupil diameter in a direction parallel to the optical axis, ETP2 is a thickness of the second lens at the 1/2 entrance pupil diameter in the direction parallel to the optical axis, and CT1 is the center thickness of the first lens along the optical axis.

17. The optical imaging lens assembly according to claim 13, wherein $1.0<f/f1<1.5$, where f is a total effective focal length of the optical imaging lens assembly, and f1 is an effective focal length of the first lens.

18. The optical imaging lens assembly according to claim 13, wherein $1.5 < f23/f < 3.0$,
where f23 is a combined focal length of the second lens and the third lens, and f is a total effective focal length of the optical imaging lens assembly.

* * * * *